United States Patent [19]

Slack et al.

[11] Patent Number: 5,299,348
[45] Date of Patent: Apr. 5, 1994

[54] APPARATUS FOR RECYCLING WASTE CARTRIDGE FILTER

[75] Inventors: Ray Slack; Sal G. M. Gualtieri; Michael Krywenky, all of Mississauga, Canada

[73] Assignee: Lasekim International Corporation, Mississauga, Canada

[21] Appl. No.: 702,000

[22] Filed: May 17, 1991

[30] Foreign Application Priority Data

May 9, 1991 [CA] Canada ................................ 2042151

[51] Int. Cl.⁵ .............................................. B23P 19/04
[52] U.S. Cl. ................................. 29/403.3; 29/426.3; 29/564.3
[58] Field of Search ................... 29/564.3, 403.2, 403.3, 29/426.1, 426.2, 426.4, 426.3, 426.5, 564.7; 82/92, 47, 48; 30/418

[56] References Cited

U.S. PATENT DOCUMENTS

| | | | |
|---|---|---|---|
| 3,520,218 | 7/1970 | Tolkmitt | 82/92 |
| 4,279,181 | 7/1981 | Birkestrand | 82/92 X |
| 4,537,361 | 8/1985 | Heimerich | 241/81 |
| 4,771,686 | 9/1988 | Triantos, Jr. | 100/255 |
| 4,776,248 | 10/1988 | Birkestrand | 82/92 X |
| 4,927,085 | 5/1990 | Oberg | 241/36 |
| 5,133,234 | 7/1992 | Ehlert et al. | 30/418 X |

OTHER PUBLICATIONS

Advertisement of an oil filter cutter marketed by CTEC Inc. of Salt Lake City, Utah.

Primary Examiner—Z. R. Bilinsky
Attorney, Agent, or Firm—Neil H. Hughes; Ivor M. Hughes

[57] ABSTRACT

An apparatus for dismembering used cartridge filters, the cartridge filters having a top and bottom, the top including a baseplate having an outlet and at least one inlet, the baseplate being adapted to mount with a machine, the filter including a casing extending from proximate the top to the bottom of the cartridge filter and affixed to the baseplate proximate the top of the cartridge filter, the cartridge filter including a disposable filter media included inside the casing;

the apparatus comprising means for receiving waste cartridge filters, means for delivering the filters to a predetermined position, means for holding the filter at the predetermined position, means for separating the baseplate and the canister, means for removing the canister from the remnant of the filter and segregating said canister, means for separating said baseplate from the remnant of said filter and segregating said baseplate, said remnant including said disposable filter media, means for handling said remnant and segregating said remnant, means for collecting and segregating any waste filtrate, such as oil, in the apparatus and segregating said filtrate, whereby waste cartridge filters are dismembered by said apparatus and the components thereof segregated for recycling purposes.

3 Claims, 10 Drawing Sheets

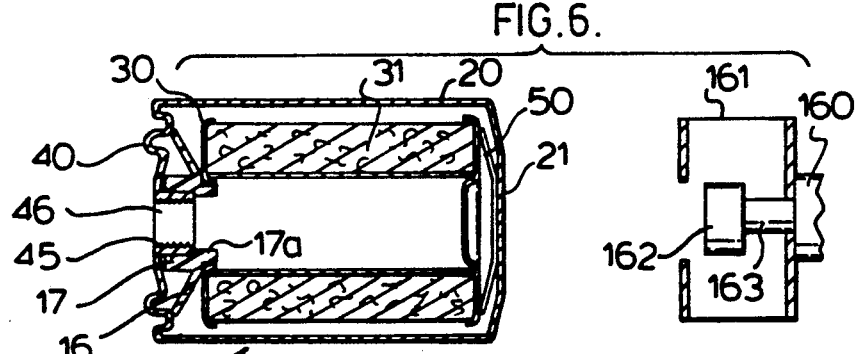
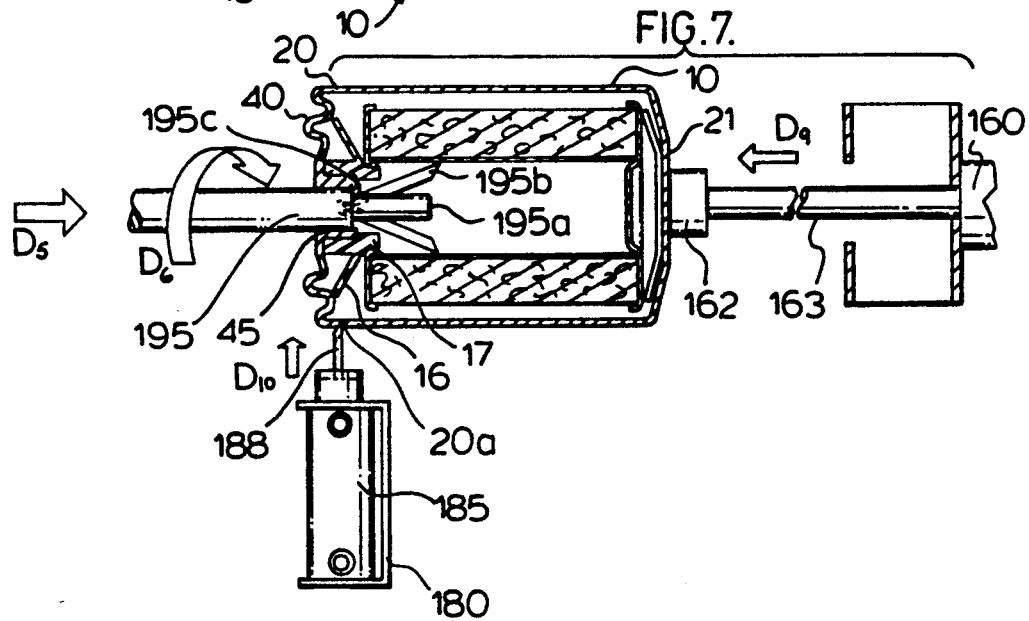
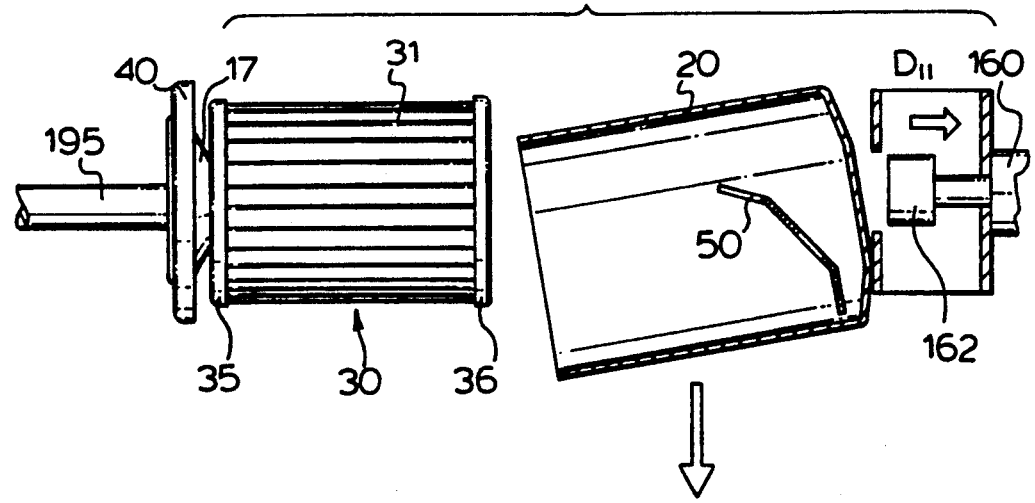

APPARATUS FOR RECYCLING WASTE CARTRIDGE FILTER

FIELD OF INVENTION

This invention relates to an apparatus for recycling waste cartridge filters or the like and a method related thereto. The invention finds particular application to disposable oil filters.

BACKGROUND OF THE INVENTION

There is more and more emphasis today on the proper handling and disposal of waste. Of particular importance is the manner in which hazardous wastes, (wastes that potentially pollute our environment), are handled. Specifically referring to cartridge type filters and specifically to oil filters there exists a need for improvement in the manner in which these filters are disposed. Typically these filters may be thrown out with the general garbage stream. For garages or lubrication pits who accumulate a sizeable number of filters, they must be handled as hazardous wastes and therefor command a premium in handling and disposal costs.

Within the prior art there exists a number of devices which handle disposable filters. U.S. Pat. No. 4,771,686 to Triantos issued Sep. 20, 1988 refers to a unit which merely crushes waste containers such as cans and oil filters for reduction in the volume occupied by the filters when handled. The internal portions are not segregated for separate handling and disposal.

Referring to U.S. Pat. No. 4,537,361 to Heimerich issued Aug. 27, 1985, there is described an apparatus for handling glass, cans or the like. However the reference does not refer to the segregation of the components of a filter but merely to the separate handling of glass, metal and plastic.

Referring to U.S. Pat. No. 4,927,085 to Oberg issued May 22, 1990 there is described an apparatus for recycling oil filters. However there is no discussion within this reference of the dismembering of the filter. The filter is crushed with all its contents prior to disposal.

An oil filter cutter is marketed by CTEC Inc. of Salt Lake City, Utah which in essence is a can opener and allows the removal of the filter element for complete drainage and disposal. This unit merely cuts open the filter and does not include the separation and segregation of the components of the filter.

Nowhere within the prior art is there provided an apparatus which allows for the dismembering of a disposable filter cartridge and the segregation of the components thereof for handling recycling and disposal if necessary. In segregating each component an opportunity is provided to easily recover and potentially reuse much of the components of the cartridge filter. This opportunity did not exist in the prior art heretofore.

It is therefor a primary object of this invention to provide an apparatus for the dismembering and segregating of the components of a cartridge filter and method thereof.

It is a further object of the invention to provide a method of dismembering a disposable filter and segregating the components thereof and apparatus therefor which is simple and economical to use and convenient for garages and lubrication pits.

Further and other objects of the invention will become apparent to those skilled in the art when considering the following summary of the invention and the more detailed description of the preferred embodiments illustrated herein.

SUMMARY OF THE INVENTION

According to one aspect of the invention there is provided an apparatus for dismembering used cartridge filters, such as oil filters, preferably for recycling purposes of the segregated components of the oil filter, the cartridge filters having a top and bottom, the top including a baseplate having a preferred central outlet and at least one inlet preferably surrounding the outlet, the baseplate being adapted to mount with a machine, such as an engine, preferably the top including a first annular gasket, the filter including a casing extending from proximate the top to the bottom of the cartridge filter and affixed to the baseplate proximate the top of the cartridge filter, the cartridge filter including a disposable filter media included inside the casing, preferably the filter media being affixed to a spool like carrier through which the filtrate, such as oil, flows when filtered by the media, the spool like carrier including a top and bottom and having disposed proximate the top thereof a second annular gasket disposed between the top of the spool like carrier and the bottom of the baseplate for sealing the at least one inlet and central outlet of the filter;

the apparatus comprising (preferably a housing having disposed therewith), means for receiving waste cartridge filters (preferably a magazine for presenting a predetermined number of waste filters and requiring orientation of a waste filter in a predetermined manner to correspond with the operation of the apparatus), means for delivering the filters to a predetermined position (preferably a feed ram), means for holding the filter at the predetermined position (preferably grasping means for holding the filter at the casing thereof, preferably opposed arms preferably each arm including two angled portions which move from a position wherein the filter is grasped to a position wherein the filter is released), preferably means for removing the first annular gasket and segregating said gasket (preferably means for advancing to the position wherein the first annular gasket is disposed when the filter is held by the grasping means) (in one embodiment the first gasket is removed manually), preferably means for engaging the outlet opening of the baseplate of the filter (preferably at least two fingers or dogs which are moveable from a position wherein they are able to enter the outlet of the baseplate to a position wherein the fingers open radially outwardly to securely engage the annular portion of the baseplate disposed around the outlet; or alternatively if the outlet is threaded threaded means received within the threaded outlet of the baseplate), means for separating the baseplate and the cannister (preferably a cutting edge which is advanced to a point on the casing adjacent the joint of the casing and the baseplate to separate the baseplate and casing), preferably said means for separating including means for rotating the filter when engaged at the opening of the baseplate and when not held by the means for holding the filter (preferably including an actuator which is moveable substantially longitudinally towards and away from the predetermined position), means for removing the cannister from the remnant of the filter and segregating said cannister (preferably a cylinder having magnetic means (or alternative holding means such as suction means or mechanically grasping means such as opposed arms for grasping or the like) at the end thereof for advancing to the predetermined position and magnetically attracting the casing to the magnetic means, the magnetic means thereafter moving away from the predetermined position carrying the casing along and segregating said casing), means for separating said baseplate from the remnant of said filter and segregating said baseplate (preferably the means for rotating the filter being moveable longitudinally and including a stop means, preferably a plate, to remove the separated baseplate from the means for engaging the outlet opening of the baseplate as the means for rotating the filter moves away from the predetermined position), preferably means for separating said second annular gasket from said remnant and segregating said gasket (preferably means for advancing to the position wherein the second annular gasket is disposed when the filter is held by the grasping means), said remnant including said disposable filter media and preferably if present said spool and said filtering media, (preferably said spool being separated from said filter media and segregated for separate handling), means for handling and if the spool is present crushing said remnant and said casing and segregating said remnant (preferably said spool being previously separated from said remnant), means for collecting and segregating any waste filtrate, such as oil, in the apparatus and segregating said filtrate, whereby waste cartridge filters are dismembered by said apparatus and the components thereof segregated for recycling purposes (preferably removeable bins are provided for collection of each separated component).

According to yet another aspect of the invention there is provided a method of dismembering and segregating the components of a disposable cartridge filter, (preferably the cartridge filters having a top and bottom, the top including a baseplate having a central outlet and at least one inlet surrounding the outlet, the baseplate being adapted to mount with a machine such as an engine, the top including a first annular gasket, the filter including a casing extending from proximate the top to the bottom of the cartridge filter and affixed to the baseplate proximate the top of the cartridge filter, the cartridge filter including a disposable filter media included inside the casing, preferably the filter media being affixed to a spool like carrier through which the filtrate, such as oil, flows when filtered by the media, the spool like carrier if present including a top and bottom and having disposed proximate the top thereof a second annular gasket disposed between the top of the spool like carrier and the bottom of the baseplate for sealing the at least one inlet and central outlet of the filter);

the method comprising:
1) orienting the filter with the baseplate at one end
2) holding the filter preferably proximate the middle thereof
3) separating any outer gasket if present from the baseplate and segregating said gasket
4) separating the baseplate of the filter from the cannister
5) segregating the baseplate of the filter
6) segregating the cannister of the filter
7) separating if present the inner rubber gasket located adjacent the baseplate and spool in use
8) segregating the second gasket if present
9) segregating the filter media and if present the spool carrying the filter media
10) segregating any filtrate contained in the cartridge prior to dismembering.

Preferably the segregated metal components may be crushed prior to further handling. In one embodiment the method may further comprise the additional steps of separating the filter media from the spool and further segregating the spool if the spool is present. It is preferred that a substantial portion and ideally all of the metal, waste oil, and rubber be recycled. In a preferred embodiment the apparatus for carrying out the method may further comprise a housing having disposed therewith, means for receiving waste cartridge filters (preferably a magazine for presenting a predetermined number of waste filters and requiring orientation of a waste filter in a predetermined manner to correspond with the operation of the apparatus), means for delivering the filters to a predetermined position (preferably a feed ram), means for holding the filter at the predetermined position (preferably grasping means for holding the filter at the casing thereof, preferably opposed arms preferably each arm including two angled portions which move from a position wherein the filter is grasped to a position wherein the filter is released), preferably means for removing the first annular gasket and segregating said gasket (preferably means for advancing to the position wherein the first annular gasket is disposed when the filter is held by the grasping means) (in one embodiment the first gasket is removed manually), preferably means for engaging the outlet opening of the baseplate of the filter (preferably at least two fingers or dogs which are moveable from a position wherein they are able to enter the outlet of the baseplate to a position wherein the fingers open radially outwardly to securely engage the annular portion of the baseplate disposed around the outlet; or alternatively if the outlet is threaded threaded means received within the threaded outlet of the baseplate), means for separating the baseplate and the cannister (preferably a cutting edge which is advanced to a point on the casing adjacent the joint of the casing and the baseplate to separate the baseplate and casing), preferably said means for separating including means for rotating the filter when engaged at the opening of the baseplate and when not held by the means for holding the filter (preferably including an actuator which is moveable substantially longitudinally towards and away from the predetermined position), means for removing the cannister from the remnant of the filter and segregating said cannister (preferably a cylinder having magnetic means at the end thereof for advancing to the predetermined position and magnetically attracting the casing to the magnetic means, the magnetic means thereafter moving away from the predetermined position carrying the casing along and segregating said casing), means for separating said baseplate from the remnant of said filter and segregating said baseplate (preferably the means for rotating the filter being moveable longitudinally and including a stop means, preferably a plate, to remove the separated baseplate from the means for engaging the outlet opening of the baseplate as the means for rotating the filter moves away from the predetermined position), preferably means for separating said second annular gasket from said remnant and segregating said gasket (preferably means for advancing to the position wherein the second annular gasket is disposed when the filter is held by the grasping means), said remnant including said filter media and preferably if present only said spool and said filtering media, (preferably said spool being separated from said filter media and segregated for separate handling), means for handling and if the spool is present crushing said remnant and segregating said remnant (preferably said spool being previously separated from said remnant), means for collecting and segregating any waste filtrate, such as oil, in the apparatus and segregating said filtrate, whereby waste cartridge filters are dismembered by said apparatus and the components thereof segregated for recycling purposes (preferably removeable bins are provided for collection of each separated component).

BRIEF DESCRIPTION OF THE DRAWING

The invention will now be illustrated with respect to the following drawings illustrating embodiments of the invention in which:

FIGS. 6 through 14 illustrate in schematic view the steps required to separate and segregate the components of a typical oil filter and the process related thereto and illustrated in a preferred embodiment of a invention.

FIG. 14 is a flow chart illustrating a sequence of events in block diagram form and illustrated in a preferred embodiment of the invention.

DETAILED DESCRIPTION OF PREFERRED EMBODIMENTS OF THE INVENTION

Figure 1:
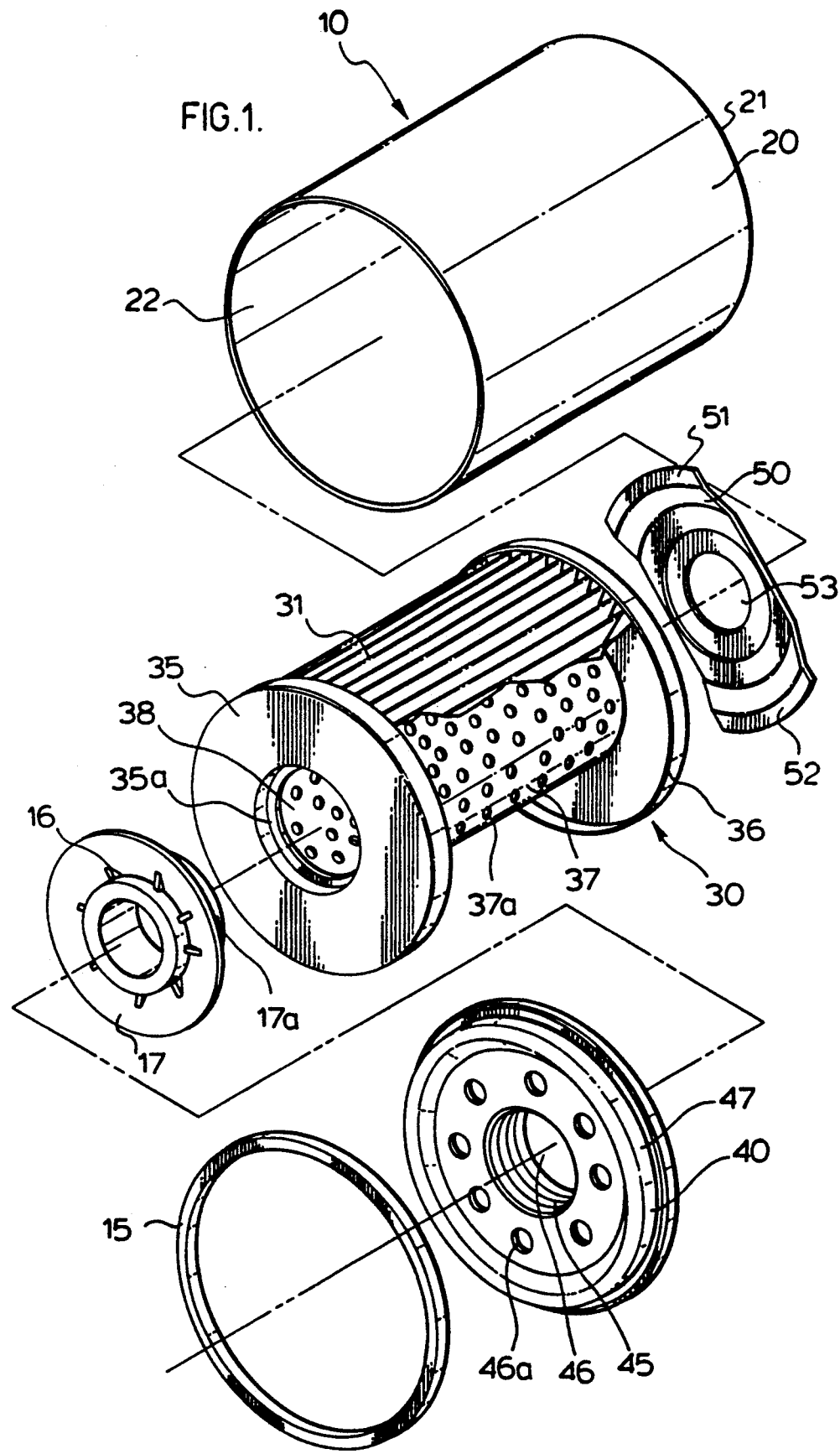
FIG. 1 is an exploded perspective view of a typically oil filter used in a vehicle exploded to show its components and illustrated in a preferred embodiment of the invention.

Referring now to FIG. 1 there is illustrated in exploded perspective view a typical oil filter. The components of the oil filter 10 include an outer casing 20 an inner filter element 30 a retainer 50 a inner gasket 17 an outer gasket 15 and a baseplate 40. An assembled view of the filter is best seen in relation to FIG. 6. It is important to note that most of the components of this typical oil filter are made from metal. The exceptions of course are the gaskets 15 and 16 which are generally rubber and the filter element 31 which is generally made from paper and fastened to the spool portion 30 at the inside of flanges 35 and 36 by epoxy. Of course some filters may include a filter element 30 which is made entirely from paper and not including the spool ends 35 and 36 or portion 37. In such a situation the filter would be limited to the baseplate 40 the canister 20 and the paper filter element only with or without the retainer 50. Separation and segregation of such a cartridge filter which includes a simpler filter element 30 would require a simpler process and such a process is not covered with this preferred embodiment. For the preferred embodiment it is assumed that the filter is substantially as shown in FIG. 1.

The baseplate 40 includes an annular recess 45 within which a neoprene gasket 15 is disposed. The baseplate 40 and the canister 20 are joined at a rolled connection not shown. It is at this rolled joint between the baseplate 40 and the canister 20 as best seen in FIG. 7 and defined as 20a where the separation of the filter begins to allow the segregation of the materials therein. The segregation of the materials will be; metal, rubber, paper and oil.

It is also possible that the canister might be made from high impact plastic. Further the spool and the baseplate may also be made from plastic in the future. The process and apparatus therefor described herein would also apply to alterations in material construction of a typical oil filter. It would be necessary in doing so to change the type of mechanism to separate the components. For example the magnetic casing extractor might be operated by suction in order to remove a plastic casing from the remnant of a filter. It is therefore Applicant's intention to described a preferred embodiment. However, those skilled in the art will realize with relatively simple modifications the various means described with the preferred embodiment may be altered to accomplish the same objectives of the invention should there be a material difference in the construction of the oil filter.

Figure 2:
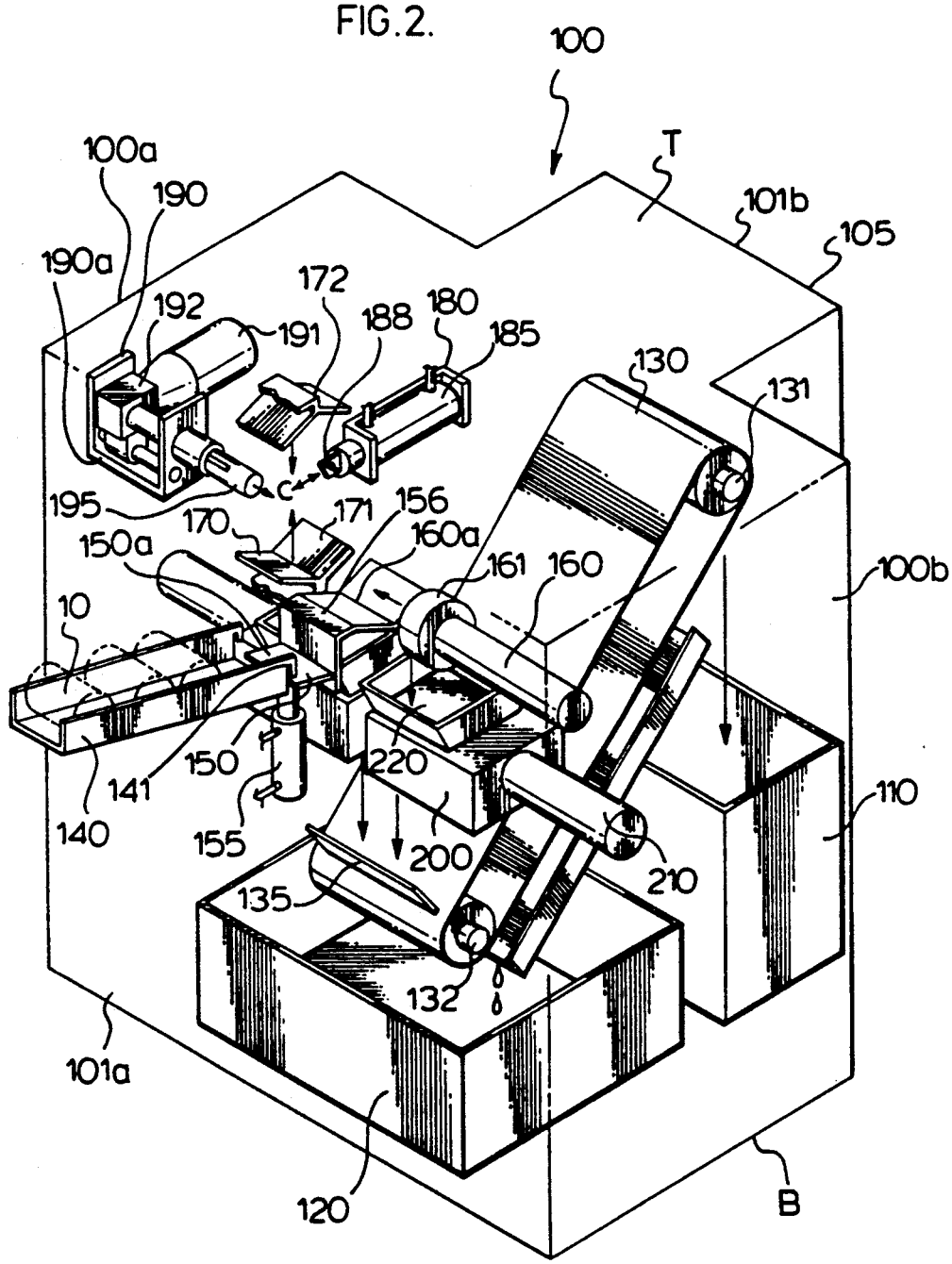
FIG. 2 is a cutaway perspective view of the apparatus used to carry out the process of the invention illustrated in a preferred embodiment of the invention.

Referring again to FIG. 1, the baseplate 40 includes a recess 47 within which the neoprene gasket 15 resides. This gasket is stripped off prior to placing the cartridge in a magazine 140, as best seen in FIG. 2, for recycling. The baseplate 40 includes an opening 46. The opening is surrounded by material in the baseplate 40 which is threaded at 45. The threaded portion surrounding the opening 46, as is known in the art, is adapted to fit to a threaded male portion with a vehicle engine. The baseplate in essence is the heaviest material within the typical oil filter and generally is made from 12 gauge stamping from steel which is approximately ⅛ of an inch thick. Inlet openings 46a are disposed about the end of the baseplate 40 which correlate with the channels 16 disposed with the inner neoprene gasket 17 which allows oil to flow from the engine manifold into the outside area of the filter through the filter element 31 through the openings 37a and back through the opening 46 to the vehicle engine. The retainer clip 50 is designed much like a Belleville spring which retains the filter element 30 against the other side of the baseplate 40 and assures a snug fit of the inner gasket 17 by the extending appendix 17a into the recess 35a of end 35 of the filter element 30. The canister 20 generally is relatively thin being in the order of about 30 thousandths of an inch.

Therefore it can be seen that the majority of the filter is made from metal which can readily be recycled. Any oil contained within the filter can also be recycled when the components are separated and segregated. The neoprene rubber gaskets can be separated and recycled and finally the paper filter portion 41 can be removed from the spool 30 optionally pressed to remove as much oil as possible and finally disposed of.

In separating the elements therefore of the typical oil filter, a serious problem in handling the oil filters as described in the background of the prior art has been effectively minimized. Any waste oil would be recycled from such a process. Any steel would be recycled, leaving only the paper filter elements potentially as waste.

Referring now to FIG. 2 there is illustrated in cutaway perspective the general arrangement of a preferred embodiment of the invention including an apparatus to separate and segregate the components of typical oil filters 100 including a top T and a bottom B, two sides 100a and 100b and two ends 101a, 101b. The apparatus 100 has disposed proximate the bottom bins 110 and 120 which act as collection areas for segregated materials. For example in this instance, bin 120 is used to collect waste oil and bin 110 is used to collect scrap metal. Other bins may be included with the apparatus 100 to collect the spent paper filter 31 of FIG. 1 and the gaskets 15 and 17. For ease of illustrations these bins have not been shown.

Figure 3:
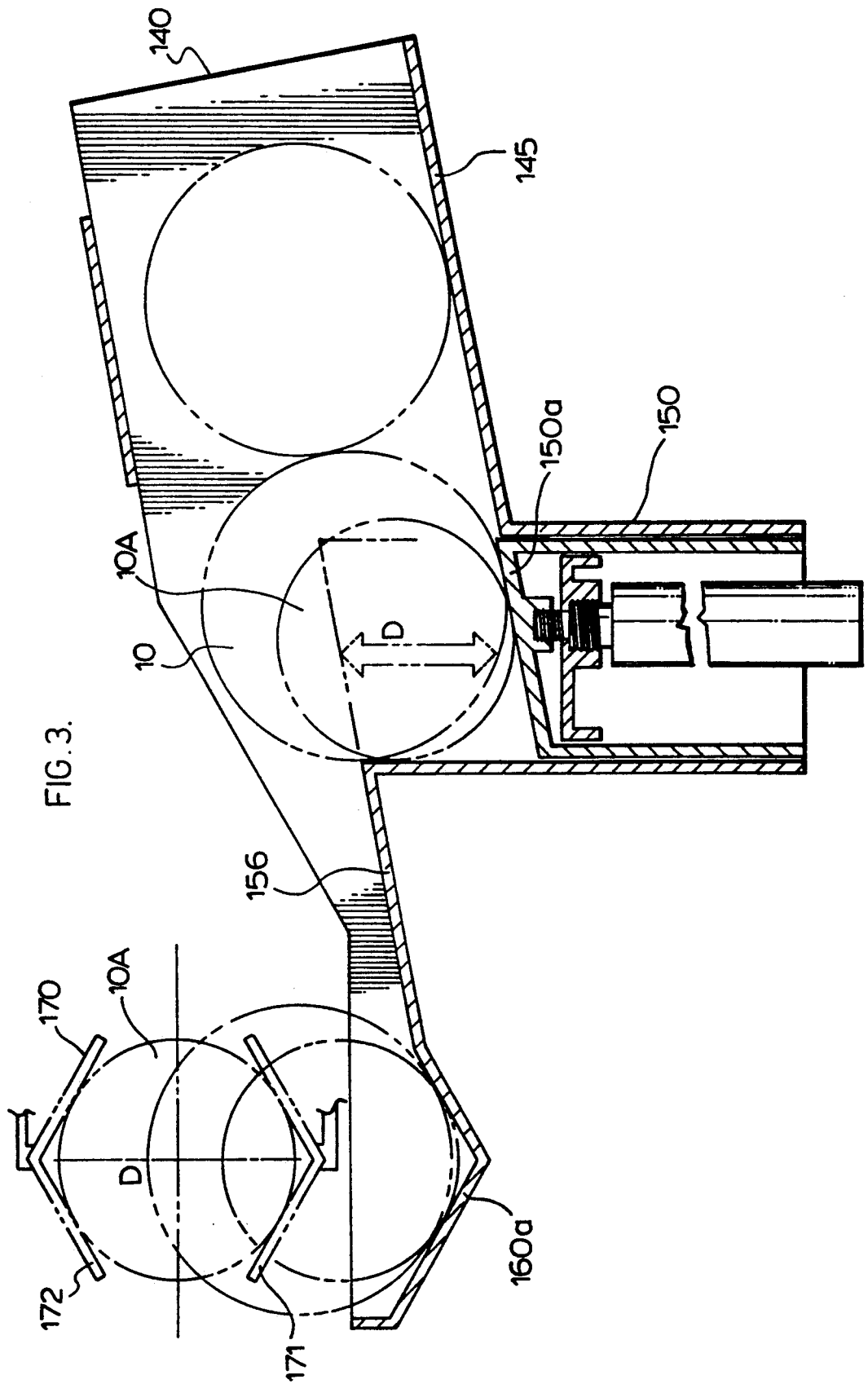
FIG. 3 is a close-up end view of the feed unit illustrated in FIG. 2 which feeds oil filters into the apparatus also illustrated in cutaway; the main arms of the indexing unit illustrated in a preferred embodiment of the invention.

The apparatus 100 includes a housing 105 which surrounds all of the components contained within the apparatus. A magazine 140 is provided. For example a lubrication pit operator would feed the filter cartridges 10 as shown in the magazine 140 which includes hook portions 141 at one end thereof. Therefore the lubrication pit operator would after removing the gasket 15 from the oil filters and placing them in a separate bin clip the magazine 140 onto the convenient pin or bar not shown. As best seen in FIG. 3 the magazine has a bottom 145 which is at an angle to the horizontal so that the oil filters will roll to the apparatus for recycling oil filters 100. A loading unit 150 is provided at the end of the magazine proximate the hook portions 141 which includes a cylinder 155 which may be either hydraulic or pneumatic and which includes a ram portions 150a which, again as best seen in FIG. 3, lifts an oil filter being fed into the apparatus over the ramp 156 and down to the indexing position 160a. As can be seen in FIG. 3 the magazine may contain oil filters which are of alternative sizes. It is important to therefore insure that the magazine is sized for this variation. The oil filter then having been loaded into the indexed position 160a is advanced to the indexing unit 170 via ram 160 or the like. In this apparatus 160 is defined as the extractor for the casing of the oil filter. It may also be used as an indexing unit if it is a double acting cylinder to index the oil filter to the center line C as seen in FIG. 2 so that the centering unit 170 may clasp the outer casing of the oil filter 10. Of course a separate cylinder may also be provided as necessary.

The oil filter is then located between the clamping elements 171, 172 of the centering unit 170 wherein the casing is held in position while the end 195 of the rotating device 190 is inserted within the opening 46 of the baseplate 40 of the filter 10. The use of this portion 195 will be described hereinafter but it is best seen in relation to FIG. 5 wherein dogs 195b enter the opening 46 and engage the threaded portion 45 by the dogs 195b. The rotator 190 is also movable to and away from the sides 100a and 100b of the apparatus 100. The centering unit 170 and its arms 171, 172 are movable toward the top and toward the bottom consecutively of apparatus 100. The cutting blade 188 is disposed with a cutting unit 180 which includes a cylinder 185 to move the cutting blade 188, which is typically carbide steel, toward and away from the ends 101a of the apparatus 100. This can be best seen in relation to FIG. 7.

It is very important to correctly index the oil filter in relation to the cutting blade and the dogs 195b of the rotator 190 to ensure the correct segregation of the components in the oil filter. As seen in FIG. 2 the rotator 190 includes a frame 190a and a drive 191 which causes the rotation of end 195 of the rotator 190. A cylinder 192 which causes the extension and retraction of the end 195 of the rotator is best seen in relation to FIG. 5 and FIG. 7.

Once the cutting blade 188 separates the casing 20 and the baseplate 40 a magnetic extraction unit as best seen in FIGS. 6, 7 and 8 and labelled as 160 having a head 161 and a magnetic portion 162 advances and extracts the casing. The casing then would drop down from the extractor 160 through the opening 220 to a metal crushing device 200 which is in the preferred embodiment operated by a cylinder 210 as best seen in relation to FIG. 13. The cylinder 210 therefore advances having a ram face 205 which crushes the object in its path. Any waste oil within the object being crushed passes through the slots 221 and the final crushed element passes downwardly onto a chain belt 130 driven by rollers 131 and 132 in a conventional manner. Paddles 135 are disposed with the belt which allow the scrap metal falling on the chain belt to be lifted a corresponding a height as required in order for the material to drop into bin 110. It is preferred that the belt 130 be chain link so that any excess oil may drain into the oil bin 120. Further dual rams 200 may be provided in order to crush different components of the oil filter 10 depending on the size and environment of the apparatus 100. Therefore in this embodiment two crushing devices are shown. It may be equally possible to provide one crushing device as long as conveyance to and from the crushing device is provided for.

Referring now to FIG. 3 the loading device 150 is illustrated in schematic view wherein a oil filter of a particular diameter D is pushed by the ram face 150a over the edge 156 into the indexed position 160a. The slop 145 of the magazine 140 allows for correct feeding of the filters to the appropriate position at ram face 150a. As best seen in FIG. 3 the oil filters 10 and 10A may be of alternative diameters and such difference would not affect the operation of the apparatus 100. An angled faced 156 allows the gravity feeding of the oil filter 10 or 10A to the position 160A as shown. A ram 160 then pushes the oil filter onto the bottom plate 171 of the centering unit 170 where it is clamped by arms 171, 172 in the position shown in FIG. 3 for further processing.

Figure 4:
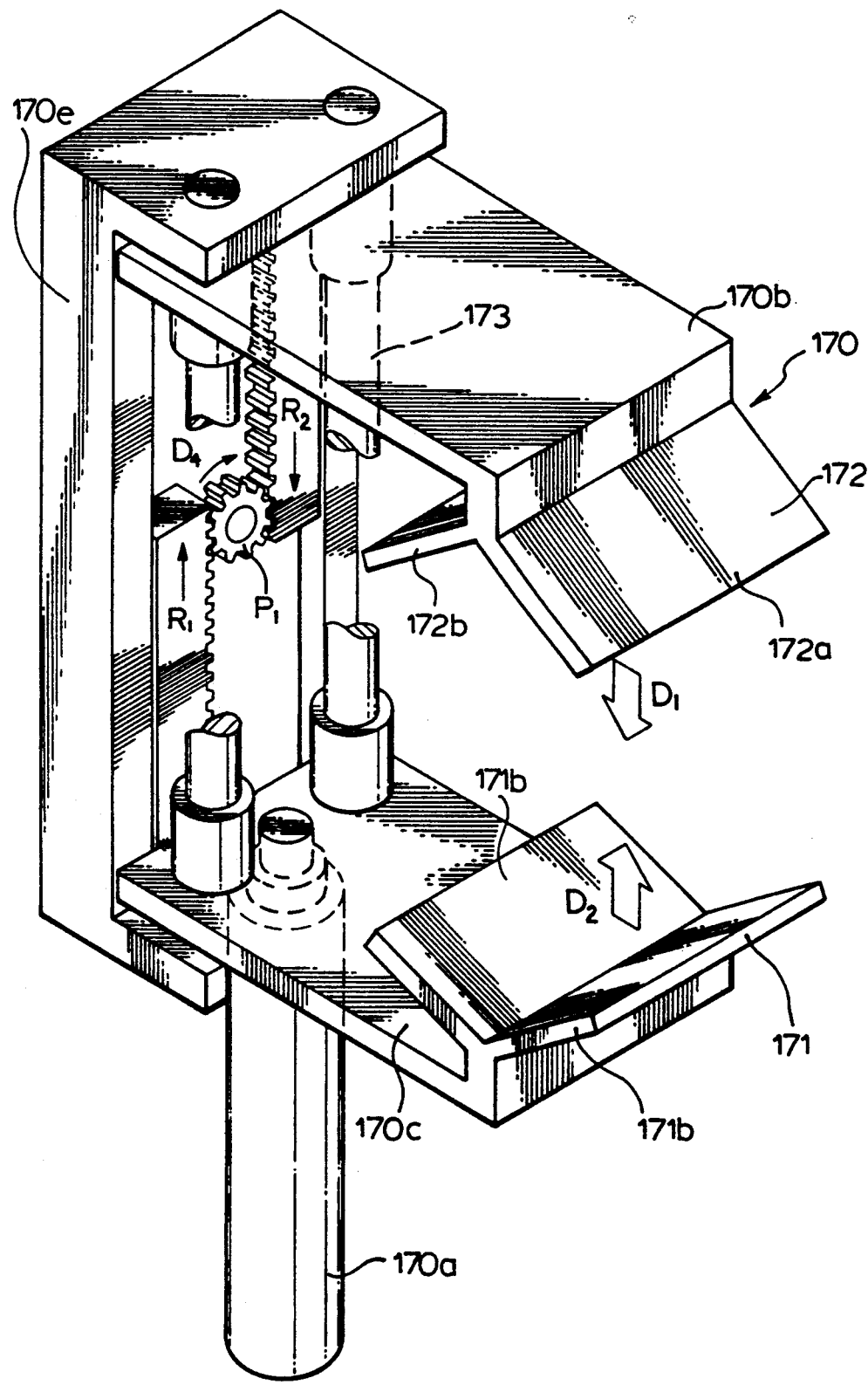
FIG. 4 is a close up perspective view of the indexing unit of FIG. 2 which holds the oil filters in position once they reach the correct location.

Referring now to FIG. 4 there is illustrated the driving device which drives the arms 171, 172 of the centering unit 170 toward one another when the oil filter 10 rest on the arm 171 as shown in FIG. 3. Therefore a cylinder 170a is provided connected to the frame portion 170c which has connected to one end thereof the arms 171a and 171b upon which the oil filter 10 sits. When the ram portion 170c is moved in an upward direction by the advance of the cylinder 170a the rack $R_1$ moves in the direction shown being affixed to 170c and the rack $R_2$ will move in the direction shown being affixed to 170b. Separating elements 173 in essence allow the portions 171 and 172 to come closer together. They maybe telescopic or in fact they may be return springs only. A pinion P1 is provided which rotates and is fastened to the frame member 171e. The pinion P1 therefore rotates in the direction D4 which is driven by the movement of the cylinder 170a to cause the arms 171 to move toward the arm 172. The teeth as shown with rack $R_1$ therefore drive the pinion P1 in a clockwise direction D4 which pinions teeth engage the tail of the rack $R_2$ and drive the rack $R_2$ in a downward direction as shown causing the arms 171 and 172 to come together and grasp the oil filter 10 therebetween. It is therefore imperative as best seen in FIG. 2 that the oil filter as best seen in FIG. 3 be correctly indexed in position so that it may be grasped by the arms 171 and 172.

Figure 5:
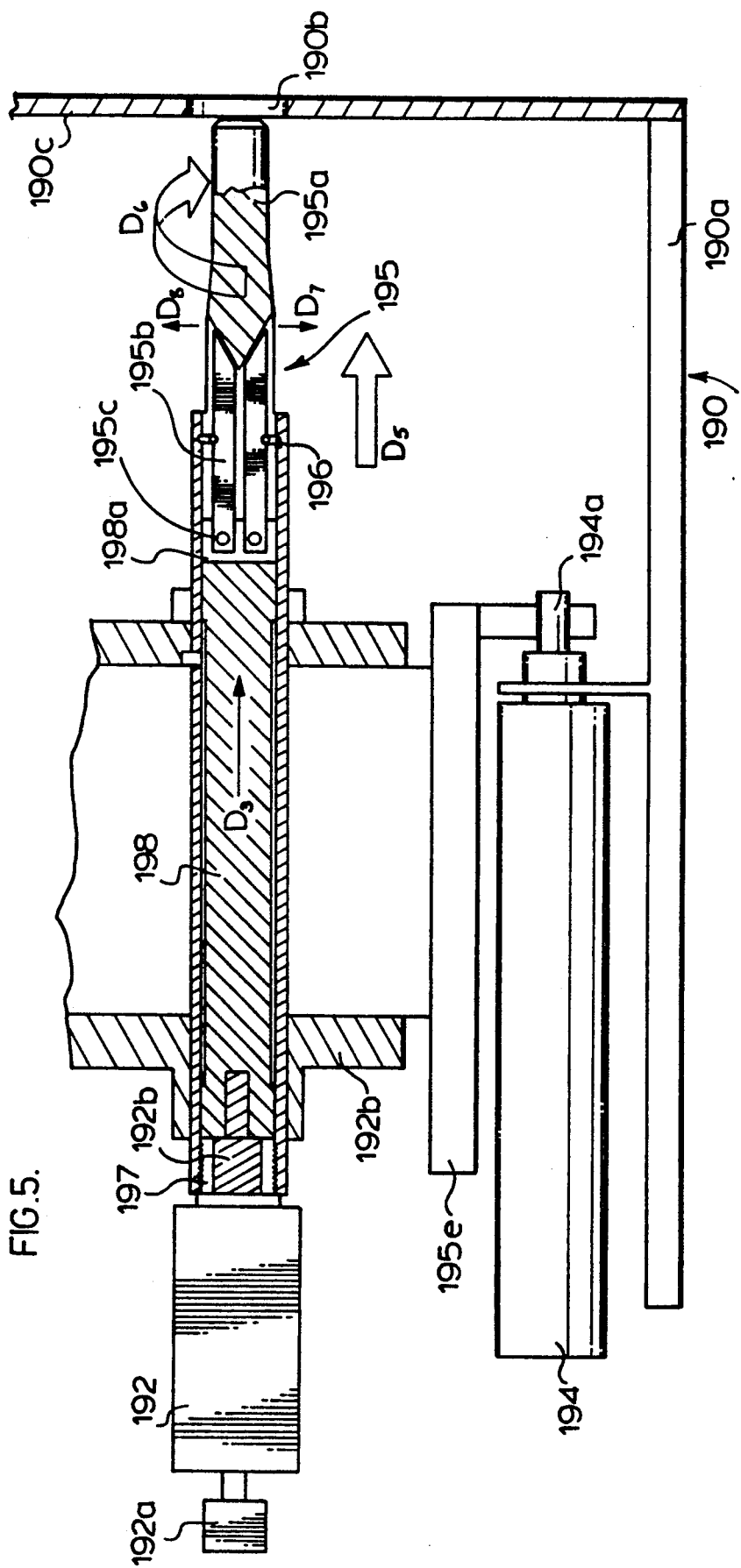
FIG. 5 is a cross sectional side view of the rotator unit 190 of FIG. 2 illustrating the components thereof in a preferred embodiment of the invention.

Once the oil filter 10 is clamped between the arms 171 and 172 in a position as seen in FIG. 6 the rotating device 190 as best seen in FIG. 5 advances to a position as best seen in FIG. 7 to engage the opening 46 of the baseplate 40 of the filter 10. In order to properly engage the opening 46 therefore the actuator must be movable in a direction substantially as shown in FIG. 2 and in FIG. 5. To accomplish this motion therefore, a cylinder 194 is provided connected to a frame portion 195e to which the actuator portion 190 generally is attached. A stop plate 190c is provided having an opening 190b therethrough, through which a forward end of spindle 195 of the rotator 190 passes. The forward end of spindle 195 therefore as best seen in FIG. 7 enters the opening 46 of the oil filter 10 until such time as at a predetermined point the cylinder 192 advances causing the interior piston 198 to move in a direction D5. Dogs 195b made from hardened steel are used to grip the threaded portion around the opening 46 of the filtered 10. These dogs are advanced by movement of the interior piston 198 against the end 198a of the assembly disposed proximate the end of spindle 195 of the rotator portion 190. The dogs 195b therefore are pushed in a forward direction over the end 195a of the spindle 195. The dogs 195b are pivotable at pins 195c and retained in position by spring clips 196 as they move forward. A total movement of three quarters of an inch stroke is provided by the cylinder 192. An adaptor bushing 197 is provided which engages the drive 191 to rotate the spindle 195 during the cutting process once the dogs 195b engage the threaded portion 45 of the opening 46 of the filter 10. The cylinder 194 therefore at a predetermine time would operate to advance spindle 195a to the opening 190b as best seen in FIG. 7 into the opening 46 of the oil filter. This would occur following the clamping arms 170, 172 having centered the oil filter 10 in the correct location so that the opening may be accessible to the dogs 195b. There are 4 dogs 195b provided which engage the interior of the oil filter as seen in FIG. 7. Once the dogs 195b engage the interior of the oil filter the motor 191 drives the spindle 195 to rotate in a direction D6 and therefore rotate the entire oil filter.

It is not mandatory that the oil filter be rotated. But in a preferred embodiment known to the Applicants at this time it appears to be the simplest approach. Alternative embodiments may include the rotation of the cutting blade about the filter with the filter remaining stationary. Further an alternative embodiment may include the passage of a shearing guillotine type mechanism at a predetermined location 20a as best seen in FIG. 7 to separate the baseplate 40 from the casing 20. The structure of FIG. 5 therefore is a preferred embodiment at the present time. Alternative embodiments are always sought to improve the performance of the unit and reduce the number of moving parts therein. The method may be practiced without having an apparatus therefore.

The reader is directed to FIGS. 6 through 13 and FIG. 14 in correlation to FIG. 2 to fully comprehend the apparatus and method thereof. Referring to FIG. 6 there is illustrated a cartridge filter 10 having the attributes of the filter as illustrated in FIG. 1. Therefore the filter 10 includes a baseplate 40, a canister 20, filter element 30 and a casing 20 having an end 21. It is assumed in FIG. 6 that a casing 20 is being held by the centering device 170 as best seen in relation to FIG. 4 and FIG. 2. The magnetic extraction unit 160 is advanced so that the magnet 162 engages the end 21 of the case 20. The spindle 195 therefore advances into the opening 46 of baseplate 40. The dogs 195b engage the interior of the opening 46 as shown in FIG. 7. Therefore the casing extractor 160 and the magnetic portion 162 engage the end 21 the casing 20 to add suitable support to the rotation of the filter 10 by the spindle 195 in the direction D6 by the rotator 190 as shown in FIG. 5 to and FIG. 7. The cutting blade 188 therefore is positioned correctly because of the initial indexing of the oil filter by the centering unit 170. The cutting blade 188 therefore is advanced as the filter 10 rotates on the spindle 195 as engaged by the dogs 195b in the direction of rotation D6 and the cutting blade therefore separates the baseplate 40 from the canister casing 20 at the rolled flanged 20a between the baseplate 40 and the casing 20. The blade is advanced by a cylinder 185 and in a direction D10 and may be retracted in an opposite direction. Therefore the casing 20 is separated from the baseplate 40.

It is possible in alternative embodiments to retain the casing 20 in a fixed position and have the blade 188 rotate about the casing or alternatively to be merely shear by a guillotine type device. In this alternative example the spindle 195 would not be present as the filter 10 would not require rotation. The centering unit 170 would therefore center the filter 10 in correct position for the guillotine which is proposed.

In a preferred embodiment however the magnetic casing extractor would then retract leaving a filter remnant 30 still engaged by the dogs 195b of the spindle 195 which retains the baseplate 40, the gasket 17, and the spool 30 at the end thereof. The casing 20 and the retaining spring 50 would drop through a crushing device 200 and be lifted by a chain belt, crushed and drained and conveyed to a receptacle such as 110. This may be best seen in relation to FIG. 2 and FIG. 13.

Figure 9:
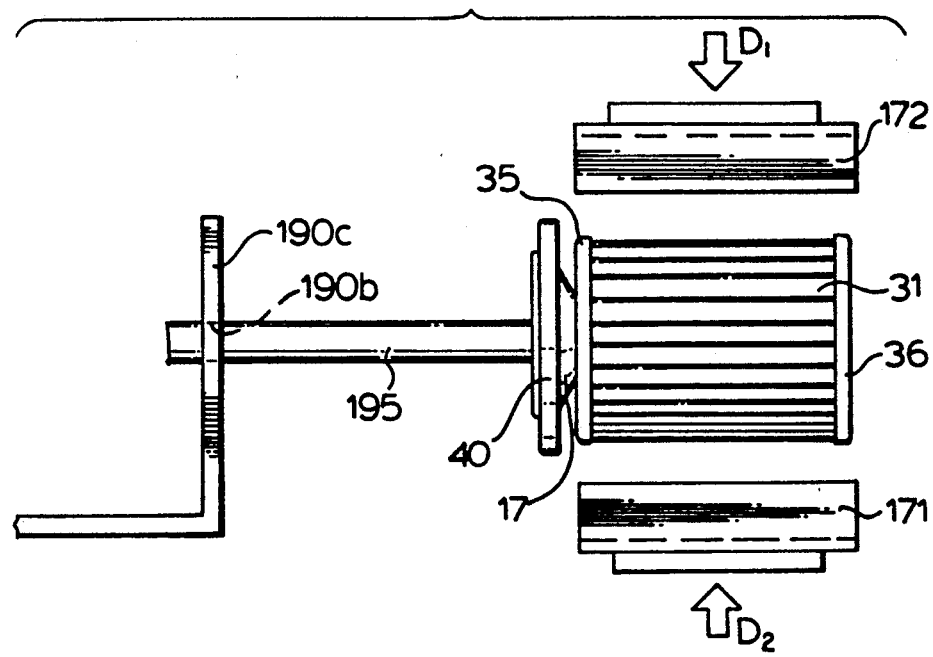
Figure 10:
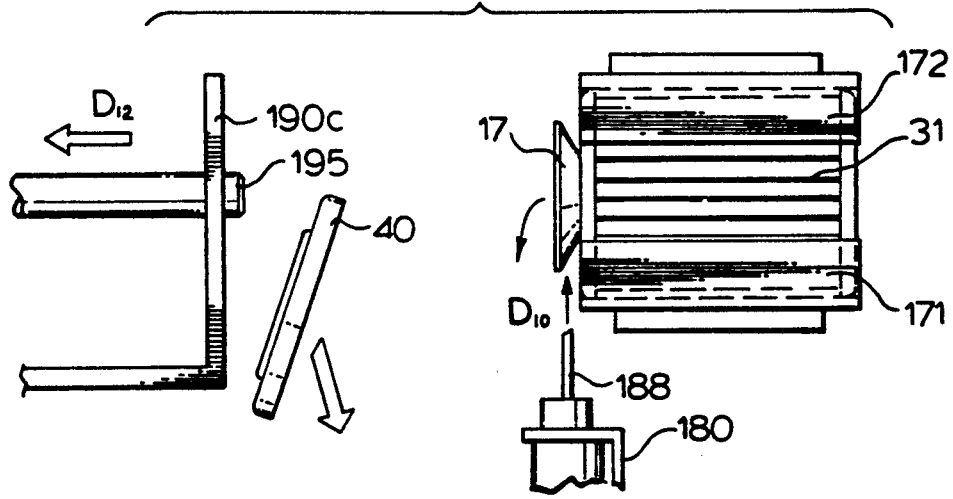

Referring to FIG. 8 if it is desirable to recycle the metal contents of spool 130 the steps of FIGS. 9 through would be required. If it is not desired to recycle the components of filtered remnant 30 then the entire filter remnant baseplate 40, and gasket 17 may be segregated to the rubber components and the metal components with the spool portion 30 being potentially crushed and thrown out as waste. However it is preferred that as much metal be recovered as possible. Therefore as best seen in FIG. 9 the centering unit 170 the arms 172 and 171 will again advanced upon filter remnant 30 and capture same therebetween. The rotator will retract at that point taking the baseplate 40 along with it until such time as the baseplate 40 reaches the stop 190c wherein the spindle 195 passes through the opening 190b and the baseplate drops down into a bin. It is not necessary to crush the baseplate further. The gasket 17 predictably should remain with the filter remnant between the arms 171 and 172. At this point the cutting blade 188 may be advanced to dislodge the appendage 17A from the opening 35a as best seen in FIG. 1 to separate and segregate the interior gasket 17, which drops to a separate bin.

Figure 11:
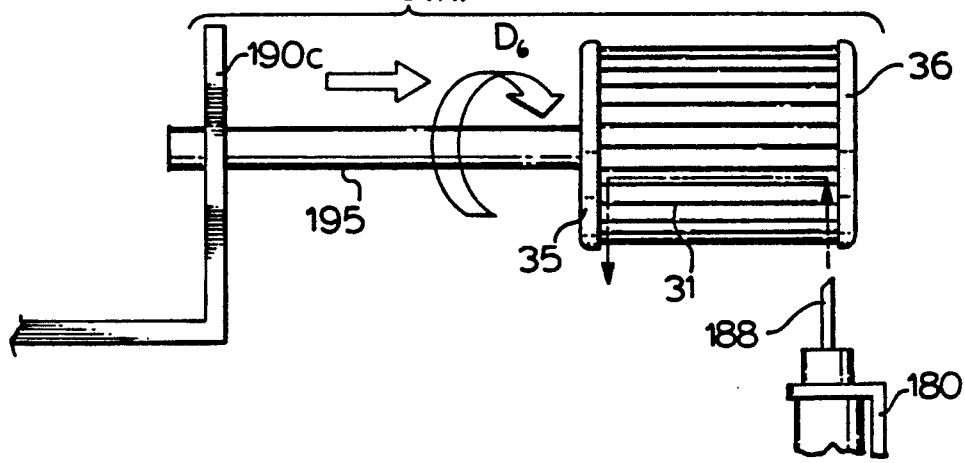

The spindle 195 therefore is advanced, once the baseplate drops into the segregated appropriate bin, to engage the opening 38 of the filter remnant 30 as best seen in FIG. 1. In like manner as FIG. 7 the dogs 195b engaged the interior wall of the filter remnant 30 to anchor the filter remnant on the spindle 195. The centering device 170 is therefore retracted to leave the filter remnant 30 free to rotate on the spindle 195. The cutting blade 188 is therefore advanced to a predetermined location as shown in FIG. 11 to allow the cutting blade to move by conventional means between the flanges 35 and 36 in the direction shown to cut away the paper element 31 and to be left with a residue as best seen in relation to FIG. 12. The spindle 195 then retracts as best seen to FIG. 12 until such time as the filter remnant 30 reaches the stop 190c and the spool 30 is dropped in like manner to baseplate 40. The only exception is that the spindle would require crushing and therefore would drop into a crushing unit 200 and be indexed in the direction substantially as shown in FIG. 13. The ram face 205 would then advance as powered by the cylinder 210 to crush the spool remnant 30 into a flattened member which would then drop onto the chain belt and be carried to the appropriate bin. The shape of the pressing unit is substantially as shown in FIG. 13. The side wall 220a is substantially inclined for the feed hopper 220 to allow the proper indexing of spools and spent casing alike. This is important so that the cylinder 210 is not strained by crushing the casing 20 or the spool 30 longitudinally. It is known that the force or effort required to crush these elements laterally should be less than the efforts required to crush them longitudinally. The bottom of the crusher unit has a number of slotted openings approximately ¼ inch wide and tapered as drainage openings for any waste oil trapped within the separated casing or remnant spool. These slots are shown as dotted line 221.

No discussion of the stripped paper filter element 31 past FIG. 11 is provided. This paper 31 should be fairly well saturated with oil and it is suggested in one alternative that the paper be pressed in a ram type structure similar to that shown in FIG. 13 to press out the oil and recycle the oil. The residue paper would then be discarded. This is recommended over solvent extraction of the paper as recycling of the solvent would be required and a distillation apparatus would be neccessary which would further complicate such a structure.

Figure 12:
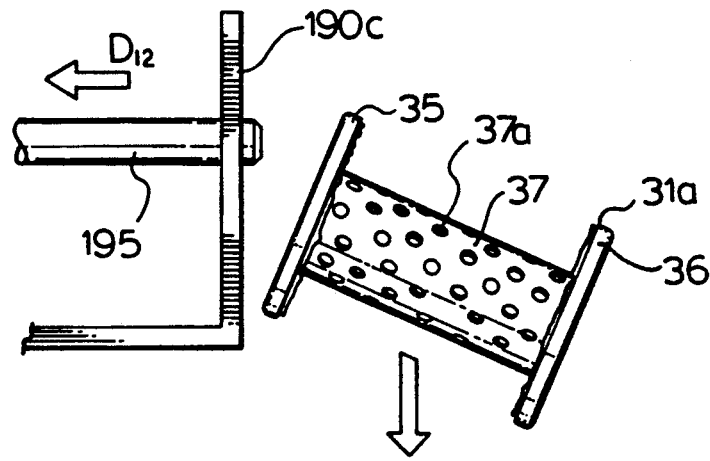
Figure 13:
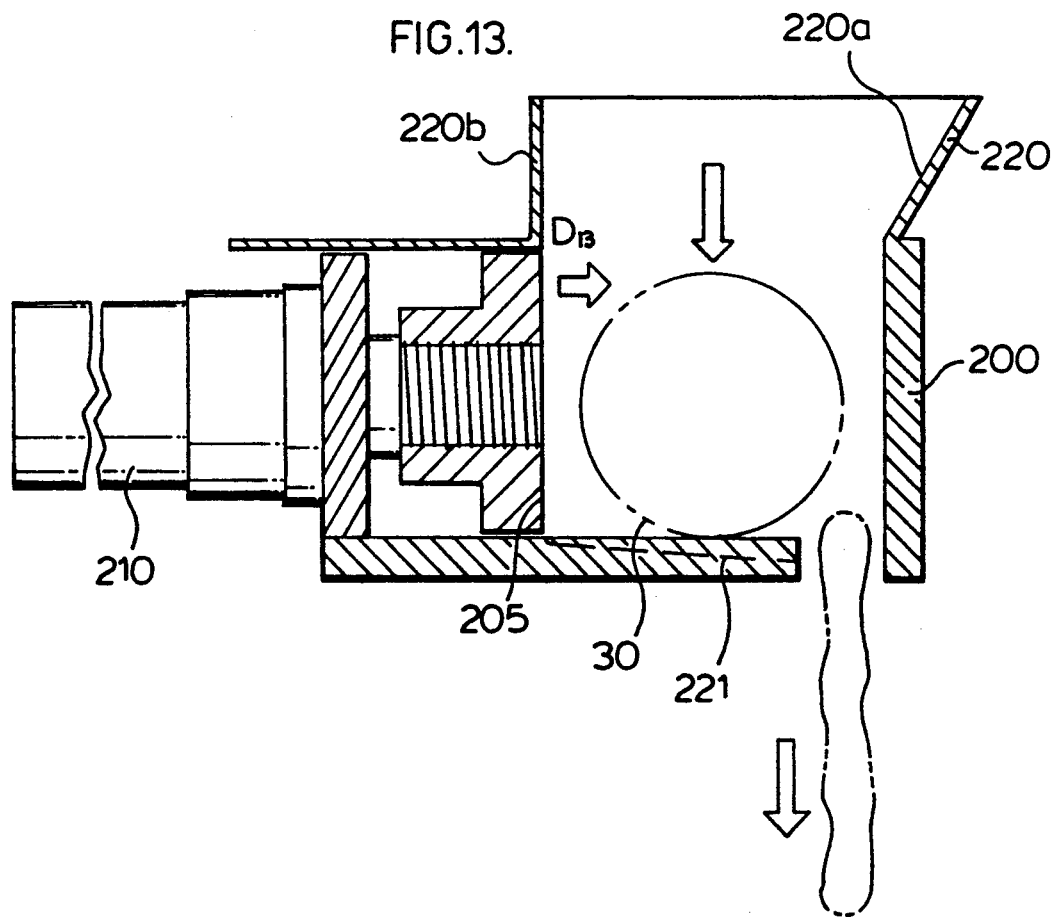

As best seen in FIG. 12 the spool 30 includes near the ends 35 and 36 residual paper 31a which is left after the cutting knife passes between the spool ends 35 and 36 as best seen in FIG. 11. This paper 31a is bound by epoxy to the interior wall of the spools 35 and 36. It is suggested that this small amount will not affect the recycled value of the spool 30 and that such spool should be entirely recoverable.

Figure 14:
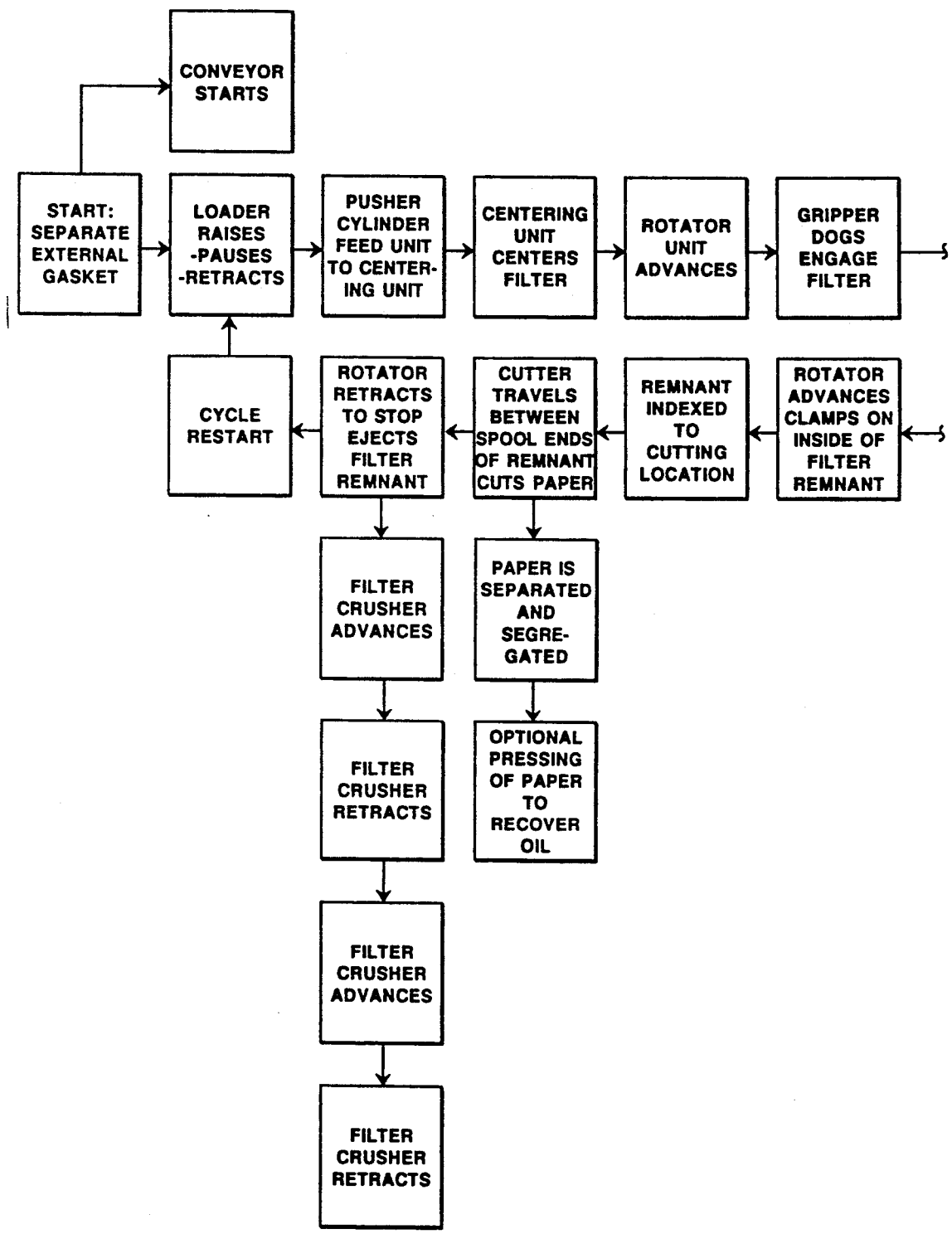
Figure 14:
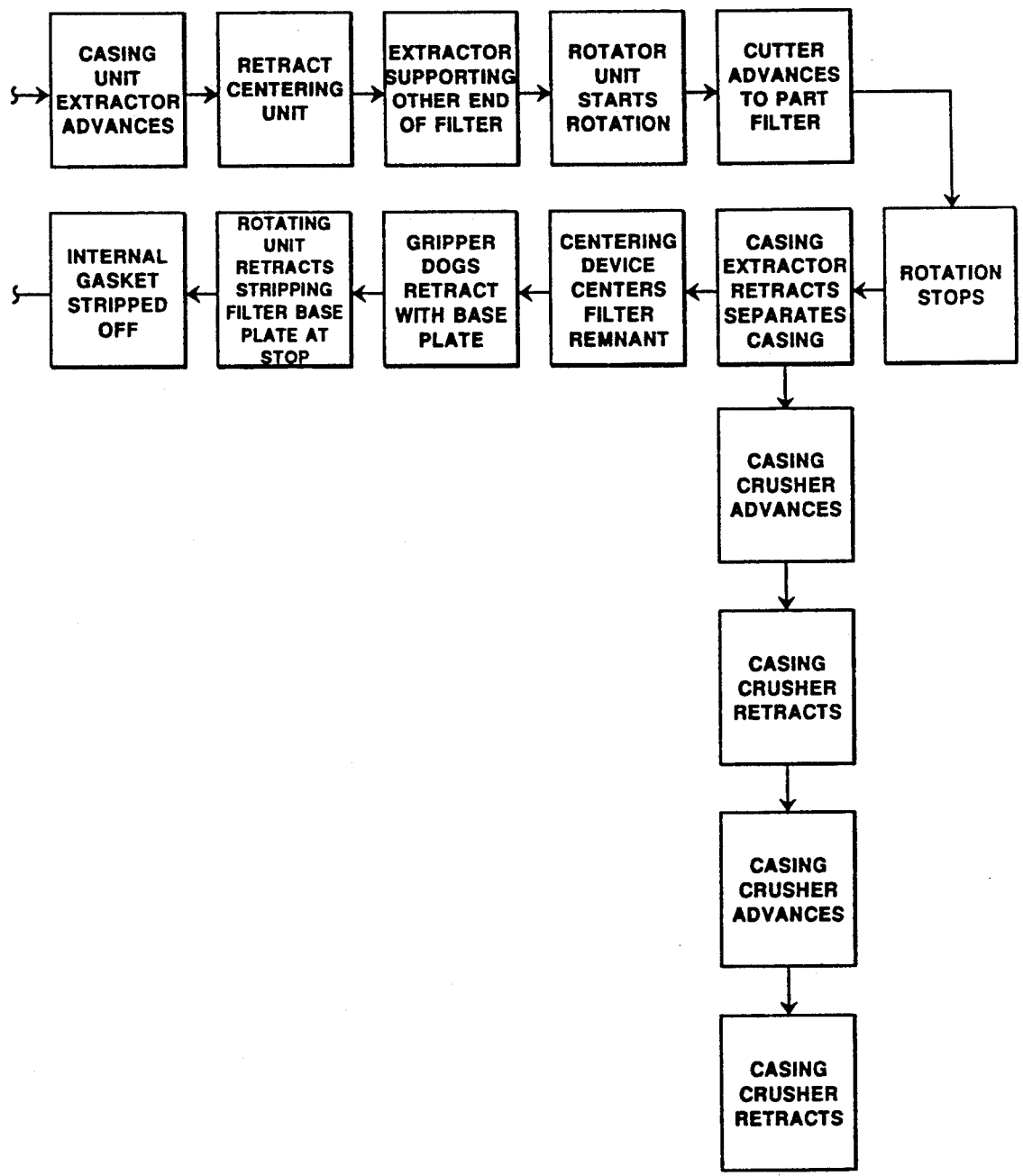

Referring now to FIGS. 14 in correlation to FIGS. 6 through 13 there is described a block diagram which essentially summarizes the flow and sequence of operations in separating and segregating the components of a waste oil filter. This flow chart should be reviewed in conjunction with the detailed description provided above in relation to FIGS. 6 through 13.

Should the oil filter 10 include a filter element 30 therewithin entirely made from paper, it is important that the apparatus recognize this situation when it occurs. One of the ways that is proposed that might be recognizable to a process controller is if the pressure required by the dogs 195b be determinable against the side walls surrounding the opening 38 of the filter spool 30. If the side walls are manufactured from paper then the dog elements 195b will cut into the side walls surrounding the opening 38 of filter element 30 which dogs 195b will penetrate a greater amount into side walls of paper then if the spool were substantially of metal as shown in FIG. 7. This would be a determination to the controller of the apparatus that the interior spool 30 is not metallic and therefore not recyclable along with the other metal. At this point the apparatus may override the sequence of events and merely dispose of the filter elements instead of taking the filter elements through the steps as illustrated in FIGS. 6 through 13. Alternatively the filter element which is made from paper might be dropped into the proposed unit for pressing the oil from the filter paper element in like manner substantially as shown in FIG. 11, with the exception that the residue would be discarded.

Therefore in order to control the sequence of operation as shown in FIG. 14 and to have intelligent control, it is recommended that a programmable microprocessor be included with the apparatus. The microprocessor would then control the flow as shown in FIG. 14 and the sequence of events as illustrated in FIGS. 6 through 13. If sensors are provided at predetermined locations which identify the type of oil filter being separated and segregated then the micro processor could control the flow and illuminate any redundant steps in FIG. 14. For example, if a paper element 30 were provided inside the casing 20 once the casing extractor retracts and separates the casing and the spindle 195 retracts stripping the baseplate at the stop, the rotator would advance and clamp on the inside of the filter remnant via the dogs 195b. If the dogs cut into the filter element beyond the predetermined amount this would be a signal to the micro processor that the steps required for indexing the remnant and cutting the paper from the spool would be redundant. The remnant would then be retracted to the stop and drop and be discarded or pressed to recover the oil. The details of the micro processing logic and circuitry are not provided as it is assumed that one skilled in the art could purchase the appropriate micro processor to work in conjunction with the apparatus and thereby control the sequence of events as shown in FIGS. 6 through 14.

As many changes can be made to the preferred embodiment of the invention without departing from the scope of the invention; it is considered that all matter contained herein by considered illustrative of the invention and not in a limiting sense.

The embodiments of the invention in which an exclusive property or privilege is claimed are as follows:

1. A method of dismembering and segregating the components of a disposable cartridge filter the cartridge filters having a top and bottom, the top including a baseplate having an outlet and at least one inlet, the baseplate being adapted to mount with a machine, the filter including a casing extending from proximate the top to the bottom of the cartridge filter and affixed to the baseplate proximate the top of the cartridge filter, the cartridge filter including a disposable filter media included inside the casing;

the method comprising
1) orienting the filter with the baseplate at one end
2) holding the filter
3) separating any outer gasket if present from the baseplate and segregating said gasket
4) separating the baseplate of the filter from the canister
5) segregating the baseplate of the filter
6) segregating the canister of the filter
7) separating if present the inner rubber gasket located adjacent the baseplate and spool in use 8) segregating the second gasket if present
9) segregating the filter media and if present the spool carrying the filter media
10) segregating any filtrate contained in the cartridge prior to dismembering.

2. The method of claim 1 wherein the segregated metal components are crushed prior to further handling.

3. The method of claim 1 wherein the filter media is provided with a spool, the method further comprising the additional steps of separating the filter media from the spool and further segregating the spool.

* * * * *